United States Patent Office 2,793,278
Patented May 21, 1957

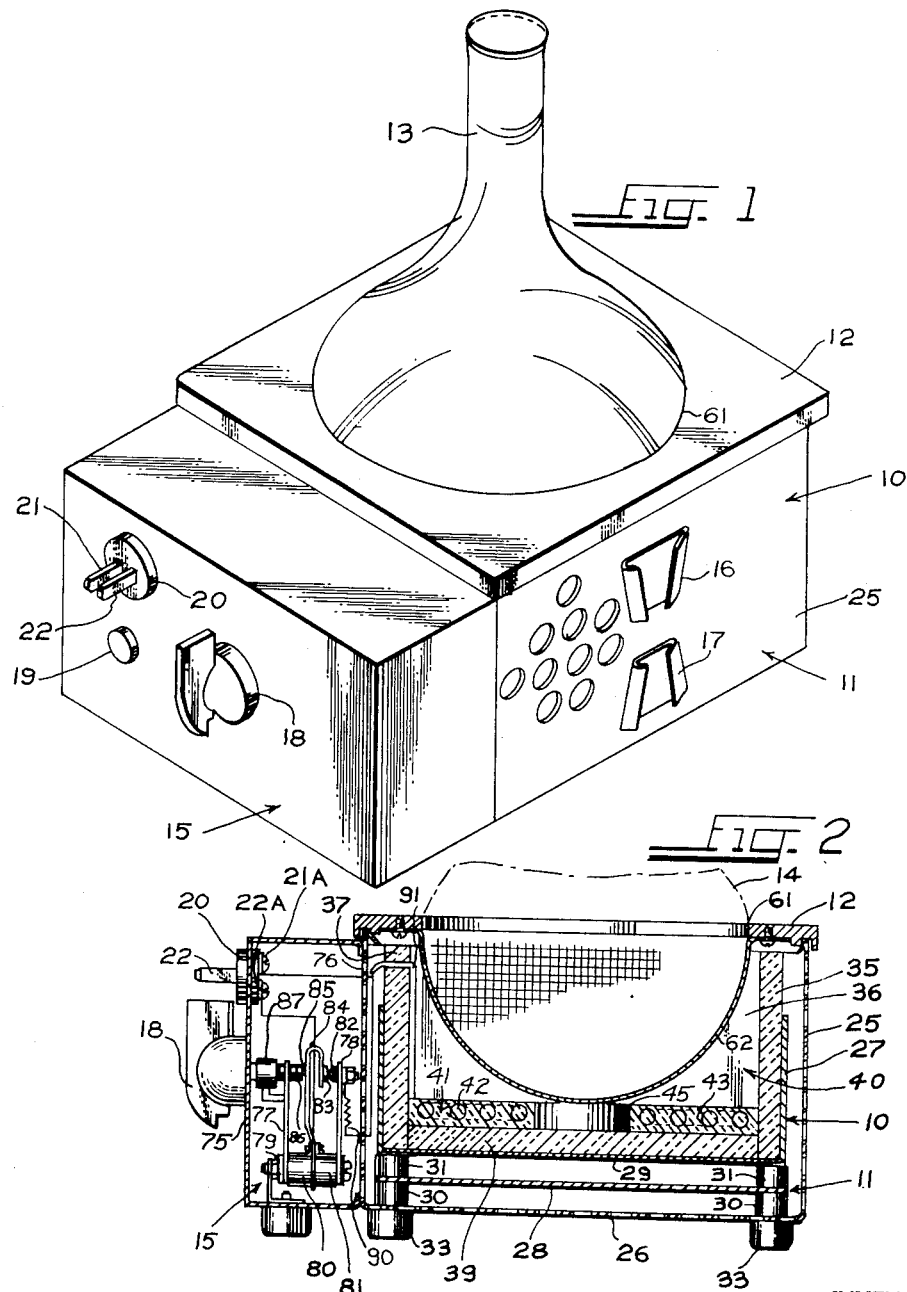

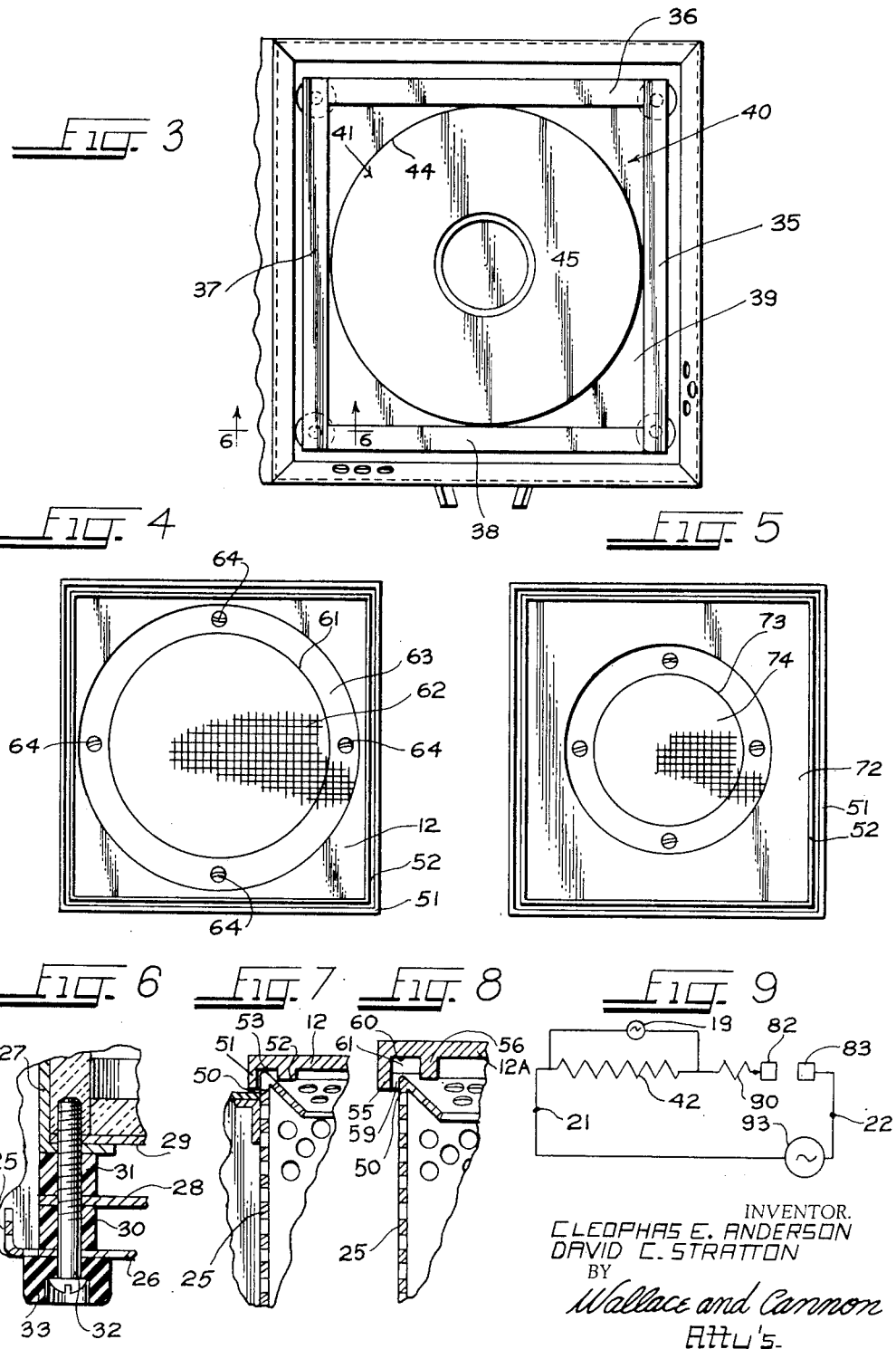

2,793,278

FLASK HEATERS

Cleophas E. Anderson, Dubuque, Iowa, and David C. Stratton, Sedalia, Mo.

Application August 24, 1956, Serial No. 612,079

16 Claims. (Cl. 219—38)

(Filed under Rule 47(a) and 35 U. S. C. 116)

This invention relates to a heating device and is particularly concerned with a heater suitable for the heating of flasks and like vessels in laboratory and other similar applications.

In many chemical processes, particularly when carried out in a laboratory, it is necessary to heat liquid and/or initially solid materials within a flask and to control the heat applied to the flask very closely. In many instances, it is virtually essential that the entire surface of the flask, up to the level of the material being heated therein, be uniformly heated in order to avoid undesirable chemical and/or physical effects which could otherwise disrupt the process being carried out and perhaps break the flask. Localized heating of only a portion of the bottom of the flask, as with a single gas burner, is highly undesirable in many of these applications; for example, heat applied in this manner may cause localized vaporization of the material in the flask and lead to the phenomenon generally referred to in the chemical field as "bumping," eventually fracturing the flask. In such applications, it has been common practice to heat the flask by means of a device usually referred to as a heating mantle. The conventional mantle, generally speaking, comprises a shell of insulating material such as woven glass which is shaped to fit the bottom portion of the flask. Inasmuch as the flasks employed generally have a spherical bulb portion and a tubular neck extending therefrom, these mantles have ordinarily been substantially hemispherical in configuration. An electrical heater element is interwoven with the insulating material of the mantle and is utilized to heat the entire undersurface of the flask at a relatively uniform rate.

Although generally satisfactory in many applications, the heating mantle for chemical flasks exhibits certain distinctive disadvantages. The mantles are relatively expensive, inasmuch as it is necessary to afford an individual heating device for each different flask size which may be employed in the laboratory. Moreover, the mantle structures heretofore known in the art have generally become too hot in operation to permit handling of the flask heater in case of emergency. In other words, the exterior surface of the heating mantle reaches a temperature high enough to burn the chemist's hands seriously in the event that the flask breaks and it becomes necessary to dispose of the flask contents in a hurry.

A principal object of the invention, therefore, is a new and improved flask heater which inherently avoids or minimizes the above noted disadvantages of prior art devices.

A more specific object of the invention is the provision of a new and improved flask heater capable of operation at extremely high temperatures while permitting unprotected handling of the heater.

Another object of the invention is a new and improved flask heater construction premitting effective heating of a plurality of different size flasks with a single basic unit.

A further object of the invention is a new and improved heating device for flasks and similar vessels which effectively minimizes the possibility of localized heating of the vessel and consequently avoids localized vaporization and "bumping" within the vessel.

An additional object of the invention is the provision of a new and improved flask heater which effectively prevents spillage from a broken flask and at the same time permits handling of the heater without danger of burning, thereby affording a maximum of safety in operation.

It is another object of the invention to afford a new and improved flask heater protected to the fullest extent possible from damage which might otherwise result from the spilling of chemical agents over the interior and exterior portions of the heater.

A corollary object of the invention is a new and improved heater suitable for use with chemical flasks and other similar vessels which is inherently economical to manufacture, and which provides for relatively long maintenance-free operational life.

A flask heater constructed in accordance with the invention comprises a first shell of metal mesh having a relatively high reflective surface, particularly upon the interior surface thereof. A second shell of substantially imperforate metal having a highly reflective surface is supported within the first metal shell in spaced relation thereto and with an air space of substantial thickness separating the two shells; this second metal shell defines a heating chamber substantially larger than the base portion of the largest size flask to be heated. An electrical heating element is supported within this heating chamber in spaced heat-insulating relation with respect to the second shell. A metal mesh basket is removably supported upon the first or exterior shell. This mesh basket is formed with a configuration corresponding to that of the base portion of a particular size flask to be heated and is utilized to suspend the flask within the aforesaid heating chamber in a position in which the flask is spaced from the heating element and from the sides of the chamber. The flask is heated both by heat radiated upwardly from the heating element and by heat radiated outwardly from the heating element and reflected inwardly by one or both of the two metal shells.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structual changes may be made as desired by those skilled in the art without departing from the present invention and the purview of the appended claims.

In the drawings:

Fig. 1 is a perspective view of one embodiment of a flask heater constructed in accordance with the invention, showing a flask in heating position;

Fig. 2 is a sectional view of the flask heater of Fig. 1;

Fig. 3 is a plan view of the flask heater of Fig. 1 with the top removed and the control portion of the heater cut away;

Fig. 4 is a bottom view of the lid or top of the flask heater of Fig. 1;

Fig. 5 is a bottom view of an alternative lid structure for the flask heater of Fig. 1;

Fig. 6 is an enlarged sectional view showing the structural details of a portion of the flask heater of Figs. 1–3, taken along line 6—6 in Fig. 3;

Fig. 7 is an enlarged view, taken from Fig. 2, showing the lid-supporting arrangement employed in the flask heater of Figs. 1–3;

Fig. 8 is an enlarged detail sectional view, similar to Fig. 7, showing a preferred alternate means for supporting the top of the flask heater; and Fig. 9 is a simplified schematic diagram of the electrical wiring system of the flask heater of Figs. 1–3.

The perspective view of Fig. 1 illustrates one embodiment of a flask heater constructed in accordance with the inventive concept; the flask heater 10 shown therein includes a base 11 upon which is supported a top or lid 12. As indicated in this figure, a flask 13 of the usual spherical base type may be supported in a central aperture 61 in lid 12 in order to heat the contents of the flask. A thermostatic control device 15 is shown mounted on heater base 11; as noted hereinafter in connection with the operational description of the heater, it is not necessary that the control device be incorporated as an integral part of the heater structure in the manner shown; rather, the thermostatic or other control may be provided by a device completely separated from the heater itself. Flask heater 10 is also equipped with suitable means for mounting the heater upon a ring stand or other supporting device, the mounting arrangement in this instance comprising a conventional pair of dove-tail sockets 16 and 17 which are suitably affixed to base 11. In the illustrated embodiment, the control device 15 is equipped with a suitable indicating control knob 18, a pilot light 19, and an electrical connector 20 of conventional form having a pair of terminals 21 and 22.

The internal construction of flask heater 10 is in many respects best shown in Fig. 2. As indicated in this figure, the base 11 comprises a first or outer shell 25 of metal mesh. Shell 25 is preferably fabricated from preforated sheet metal having a relatively high reflective surface. For example, the exterior shell may be formed of perforated 20 gauge mild steel chronium plated to afford the desired high degree of reflectivity and to afford a surface which is substantially resistive to corrosion. Resort may also be had to sheet aluminum of 20 gauge or heavier having a proper finish thereon. Preferably, however, the exterior shell is fabricated from perforated stainless steel of approximately 26 gauge or heavier having a relatively high reflectivity, since the stainless steel in general affords maximum resistance to corrosion from direct contact with chemical agents and/or from the somewhat corrosive atmosphere sometimes present in chemical laboratories. As indicated in Fig. 2, the bottom 26 of shell 25 need not be continuous, although the perforated metal may be extended across the complete lower surface of the shell if desired. The surfaces of shell 25, and the reflector surfaces of other members of heater base 11 referred to hereinafter, need not be specially polished; a clean, "bright" metal surface of normal smoothness affords the requisite degree of reflectivity desired for the heater reflectors.

A second metal shell 27 of substantially imperforate metal having a highly reflective surface is mounted within exterior shell 25 in spaced relation thereto. This inner shell 27 may be fabricated from chromium-plated mild steel or like material, or from stainless steel, but preferably is formed of relatively thin aluminum. The interior shell 27 should be continuous on all sides except the top in order to afford a substantially liquid-tight container, as will be described more completely hereinafter.

An additional metal reflector 28 is mounted within base portion 11 of the flask heater, being supported in mutually spaced relation with respect to the bottom 26 of exterior shell 25 and the bottom 29 of the interior metal shell. The structural arrangement by which the two shells and reflector 28 are supported in mutually spaced relation is illustrated in enlarged detail in Fig. 6. As indicated therein, reflector 28 is spaced from the bottom 26 of shell 25 by a heat-insulating spacer 30, preferably formed from porcelain or other substantially rigid heat-insulating material. A similar spacer 31 is employed to separate the inner shell 27 from reflector 28, the entire structure being held together by a bolt 32 which extends up through exterior shell member 26, spacer 30, reflector 28, and spacer 31 and is threaded into the base of shell 27. Bolt 32 is also employed to retain a rubber foot 33 in position on the underside of exterior shell 26. The construction illustrated in Fig. 6, is, of course, repeated at several points around the heater base 11; in the illustrated embodiment, the supporting structures are located at the four corners of the heater base and afford four rubber mounting feet for the heater.

As indicated in Figs. 2 and 3, the interior or second metal shell 27 of the illustrated embodiment includes an insulating lining comprising four vertical insulating slabs or members 35, 36, 37, and 38 and a base slab or layer 39. The individual elements forming the insulating lining 35–39 are each preferably fabricated from an insulating material which remains essentially stable under relatively high temperatures; although the insulating lining may be cemented to the inner metal shell 27, it is generally preferable that the insulators be maintained in place mechanically as by controlling their dimensions to afford a tight fit within the inner metal shell, since most cements suitable for this purpose tend to shrink somewhat at the high temperatures to which they may be subjected in operation of the heater, thereby distorting and possibly cracking the insulators. Retention of the insulating members within the inner metal shell may be assisted to some extent by extending the mounting bolts 32 upwardly into the insulating lining of the heating chamber, as indicated in Fig. 6. One insulating material which has been found to be quite satisfactory for use in the heater comprises a refractory composition formed from asbestos with a fire-clay binder and is commercially available under the tradename "Marinite" from the Johns Manville Company. Of course, it is not essential that this particular material be employed as an insulating lining within the heating chamber; any material having relatively good heat-insulating qualities and capable of withstanding the relatively high temperatures developed within the heating chamber 40 defined by inner shell 27 in its insulating lining without undue distortion may be employed.

Flask heater 10 also includes an electrical heating element 41 which is supported within heating chamber 40 in spaced heat-insulating relation with respect to the inner shell 27, being spaced from the metal shell by the refractory insulators 35–39. The heating element, which in the disclosed embodiment is essentially annular in configuration, comprises a conventional heating coil 42 which forms a spiral within the base of the heating chamber and which is preferably embedded in a refractory material 43. The resistance wire from which the heater coil 42 is formed, for example, comprise the usual nickel-chromium material employed in the construction of heaters for hot plates and other similar devices.

As indicated above, heating element 41 is of essentially disc-like or annular configuration and preferably covers substantially all of the surface of insulator layer 39 within heating chamber 40. Where the peripheral surface 44 of the heater element is made of circular configuration, as indicated in Fig. 3, the corners of the ceramic insulator 39 are of course exposed; in the usual instance, however, where the vessel to be heated is of spherical configuration or some other configuration presenting a circular cross section, the absence of heating element coverage in the corners of the heating chamber is relatively unimportant. Generally speaking, however, it is highly desirable that the heating element 41 be provided with a relatively small central opening 45. This central opening, which comprises only a minor fractional portion of the total surface area of the heating element, is extremely important in preventing localized or "hot-spot" heating of the flask, as will be described more completely hereinafter. In the illustrated embodiment, the heating element 41 rests directly upon the insulator layer 39 in the base of heating chamber 40. In some instances, however, it may be desirable to afford an air space between the heater and the insulating layer to avoid deformation and/or fracture of either of these members which might result from differential shrinkage of one with respect to the other during prolonged operation of the heater at relatively high temperatures. For this purpose, the heating element 41 may be supported on individual porcelain or other insulator spacers within heating chamber 40 in essentially the same manner as employed to support members 26, 28, and 29 in spaced heat-insulating relationship with respect to each other (see Fig. 6).

As indicated in Fig. 2, the top or lid 12 of flask heater 10 is supported upon the outer metallic shell 25 of the heater base 11. The upper peripheral portion or lip of outer shell 25 is bent inwardly to afford a ridge or seat at the top of the shell upon which lid 12 rests. As indicated in the detail view of Fig. 7, this inwardly bent rim or lip 50 may extend from the side wall of shell 25 at an angle of approximately 45°, although this angle is by no means critical and may be varied to suit design requirements; the principal purpose in forming the lip or seat 50 upon the exterior shell of the heater base is to strengthen the shell at this point and to provide a smooth edge. Consequently, any other construction affording adequate strength in the exterior shell at this point for support of lid 12 may be substituted for that shown. For example, a separate metal rim could easily be welded or otherwise affixed to the peripheral edge of shell 25 to afford the necessary strength and rigidity for supporting the heater lid.

As indicated in Figs. 4 and 7, lid 12 is fabricated with an exterior rim or flange 51 projecting from the lower surface of the lid at the outer edge thereof; flange 51 fits over the edge of the seat formed by lip 50 on shell 25 and retains lid 12 in position on the heater base 11. The heater lid 12 may also be provided with an inner flange 52 to aid in positioning the lid upon the heater base, flange 52 being spaced from flange 51 to afford a peripheral depression 53 for receiving the uppermost portion of lip 50. The lid 12 may be fabricated from any metal which is substantially resistive to corrosion and consequently suitable for use in a chemical laboratory or similar environment and preferably is provided with a relatively high reflective interior surface. Thus, lid 12 may be fabricated from sheet metal, including stainless steel, the flanges 51 and 52 being affixed to the body portion of the lid by welding, riveting, or other similar means. Preferably, however, the lid of the heater is formed from aluminum, since it is highly desirable that the overall weight of the flask heater be held to a minimum, and may be most economically fabricated in the form of an aluminum casting.

An alternative and somewhat more advantageous lid construction is shown in enlarged detail in Fig. 8, which in most respects is essentially similar to Fig. 7. In this instance, however, the lid 12A is provided with exterior and interior depending flanges 55 and 56 which are essentially similar to the corresponding flanges 51 and 52 of the structure shown in Fig. 7 but which are substantially greater in height and are separated by a somewhat greater distance to form a peripheral depression 59 of considerably greater size than the corresponding depression 53 in the previously described embodiment. In this instance, the upper surface 60 of depression 59 does not make continuous contact with seat 50 of exterior shell 25 of the heater base; rather, a series of relatively small support bosses 61 are formed within the depression 60 to support lid 12A in spaced relationship with respect to the exterior shell of the heater base. This affords a substantially continuous air space between these two elements and aids in thermal isolation of the exterior shell 25 from the heating chamber of the device.

As best shown in Figs. 2 and 4, heater lid 12 is provided with a relatively large central opening 61 through which the flask 13 (Fig. 1) is inserted into the heater base 11. In the particular embodiment of the invention shown in the drawings, the heater lid 12 is intended for use in conjunction with a spherical-base chemical flask; accordingly, the opening 61 is made of circular configuration and is very slightly larger than the overall diameter of the particular size flask to be heated. A metal mesh basket 62 is affixed to the heater lid 12 and extends within heater chamber 40 when lid 12 is in operating position on the heater base, as indicated in Fig. 2. The mesh basket is of substantially hemispherical configuration and is provided with a peripheral flange 63 to permit mounting of the mesh basket upon heater lid 12 as by a plurality of screws 64. Of course, any other suitable technique may be employed to fasten the mesh basket to lid 12; for example, it may be desirable to employ rivets or to spot weld the basket to the lid, although welding is not usually desirable where the lid is cast from aluminum. Conventional snap-type fasteners of the type frequently referred to as "speed-fasteners" may also be utilized for this purpose. The metal from which mesh basket 62 is formed should of course be highly resistant to corrosion; bronze or brass mesh may be employed for this purpose, but stainless steel is preferable in view of its great resistance to the corrosive action of the reagents frequently used in chemical laboratories. As indicated in Fig. 2, basket 62 is utilized to support the flask 14 in spaced relation with respect to the heating element 42 and also maintains the flask spaced from the sides of heating chamber 40 in order to avoid undesirable localized heating action.

Fig. 5 illustrates another embodiment of a heater lid for the device; the lid 72 illustrated therein is essentially similar to lid 12 in general configuration and includes peripheral flanges 51 and 52 corresponding to those described in connection with Figs. 4 and 7. In this instance, however, the lid is provided with a substantially smaller central opening 73 within which a mesh basket 74 is suspended in the same manner as the previously described basket 62. Accordingly, lid 72 may be substituted on heater base 11 to adapt the heater base for use with a substantially smaller flask. Consequently, by providing a plurality of different lids such as lids 12 and 72 equipped with mesh baskets of different sizes corresponding to different size flasks to be heated, the heater base 11 may be made to accommodate a number of different size flasks.

The electrical control 15 illustrated in Figs. 1 and 2 is completely conventional in construction; as indicated in those figures, the control may be provided with a sheet-metal housing 75 suitably fastened to the front wall 76 of the outer base shell 25. The thermostatic control illustrated includes a pair of bimetal strips 77 and 78 supported at their lower ends upon a bracket 79 and electrically insulated from each other by a pair of insulator bushings 80 and 81. A first electrical contact 82 is affixed to the upper end of bimetal strip 78 in position to make electrical contact with a second contact 83 supported upon a spring member 84, the lower end of the spring member being supported on bracket 79 intermediate insulators 80 and 81. Spring 84 is also engaged by an insulator button 85 mounted upon the end of the shaft 86 of control knob 18. The threads on shaft 86 engage a collar 87 which is mounted in predetermined spaced relationship with respect to bimetal strip 77.

The electrical circuit of the heater and control arrangement shown in Fig. 2 is illustrated schematically in Fig. 9 and includes a first electrical lead extending from the terminal 22A of connector 20 corresponding to external terminal 22 to a connection with contact 83; in this instance the electrical circuit is completed through spring 84. The other thermostatic contact 82 is connected to heating coil 42 through an auxiliary or anticipating heater 90. The other end of the heater coil is returned to connector contact 21 through the corresponding internal terminal 21A. As indicated in Fig. 9, the pilot light 19 is preferably connected in parallel with heater coil 42, although any other suitable connection for a pilot light or other indicator may be utilized if desired. It should be noted that the electrical leads for heater coil 42 are preferably brought out through the insulating lining of heating chamber 40 at a point relatively high upon the heating chamber wall, as indicated at 91, in order to avoid forming any aperture within the heating chamber through which liquid can easily escape. It is not essential that this technique be followed, however, provided the exit point of the electrical leads is adequately sealed to retain a substantially liquid-tight enclosure for the heating chamber.

When the flask heater is placed in operation, the flask 13 is inserted through opening 61 in lid 12 and rests securely within the metal mesh basket 62. The heater is connected to a suitable source of electrical energy, represented in Fig. 9 by a generator 93, which may, for example, comprise an ordinary 110 volt A. C. line. Control knob 18 is adjusted to the desired heating range, thereby adjusting the thermostatic control comprising bimetal strips 77 and 78 and spring member 84. In the usual instance, the heater will be cool at the start of the reheating process and, consequently, contacts 82 and 83 will be closed, thereby providing a complete electrical circuit for heater coil 42.

Energization of heater coil 42 results in radiation of substantial quantities of heat from heating element 41. Because of the configuration of the heating element, a substantial portion of the heat developed by coil 42 is radiated upwardly and of course is intercepted by flask 14. A corresponding portion of the heat is radiated downwardly and most of this heat is reflected back by the reflective metal surfaces of elements 28 and 29 to heat the flask. In addition, some of the heat from coil 42 is radiated outwardly but is reflected back into heating chamber 40 by the reflective surfaces of shells 27 and 25, thereby further aiding in the heating process.

The novel and highly advantageous structure of heater base 11, with its inner and outer reflective metal shells and arrangement of insulation media, effectively prevents excessive heating of exterior shell 25. With the construction shown, heating chamber 40 may be maintained at a temperature of the order of 1200° F. without raising exterior shell 25 more than 30° above an ambient equal to normal room temperature. This characteristic of the inventive structure is highly important in those instances in which flask 13 breaks during the course of the heating operation.

No matter how closely the heat process is controlled, it is almost inevitable that a flask will occasionally break while seated within the heater and with the heater running at relatively high temperatures. When this occurs, of course, the contents of the flask spill into heating chamber 40. For this reason, it is highly important that the heating chamber be made essentially liquid-tight to avoid spilling heated chemical reagents over the laboratory. Of equal importance are the exceptional thermal characteristics of the illustrated heater, which permit manual handling of the heater even when operating at maximum temperature, which may be as high as 1200° F. Because exterior shell 25 does not go above ambient by more than approximately 30°, the chemists or other laboratory workers may, in the event of breaking of the flask, take the entire heater and immediately dump liquid contents thereof into a sink or other receptacle, thereby avoiding damage to the laboratory without endangering the worker. This safety feature of the heater is also important in that it substantially protects the laboratory worker against occasional burns otherwise engendered by accidentally brushing against the heater during the course of normal laboratory work.

After heating chamber 40 has reached the desired temperature, bimetallic strips 77 and 78 operate to open contacts 82 and 83 in the usual manner. Of course, a single-bimetal thermostatic control could be employed if desired, although the dual-bimetal arrangement illustrated is preferred since it affords inherent compensation for variations in ambient temperature. After the heater has been de-energized by opening of the thermostatic contacts and consequently has cooled somewhat, the bimetals are effective to close the contacts and continue heating in conventional fashion, thereby maintaining relatively close control over the temperature within thermal chamber 40. Of course, in accordance with conventional practice, it is desirable to calibrate the control device 15 to suit the particular thermal characteristics of heater 10, since these may vary somewhat depending upon the thermal conductivity of the electrical leads connecting the control to heater coil 42 and upon other factors, as is well known in the art.

As noted hereinabove, it is not essential that the control 15 be mounted upon or otherwise made an integral part of heater 10. Indeed, in many applications, it may be highly desirable to separate the control apparatus completely from the heater in order to permit control of several heaters from a common location and/or to permit protection of laboratory personnel where the reaction carried out in the heated flask is a dangerous one from the standpoint of either explosiveness or noxious fumes. Accordingly, it should be understood that the control arrangement shown is purely illustrative and may be changed completely without in any way departing from the inventive concept.

In the heating of flask 14, the open central portion or aperture 45 in heater element 41 plays an important part. Extension of the heating element to include this area directly underlying the center of the flask being heated very frequently leads to excessive heating of this portion of the flask in relation to the remainder thereof. Consequently, a construction in which the heater element is not provided with aperture 45 tends to produce a localized "hot spot" at the bottom central portion of the flask and thereby causes a high incidence of "bumping," frequently breaking the flask. This effect is almost entirely eliminated in the structure shown, thereby effectively avoiding one of the most troublesome problems present in heating flasks of this type.

Because lid 12 is in direct contact with flask 14, it tends to be heated to a temperature above that which would be safe for manual handling. Moreover, since the lid is formed from metal, at least some of this heat is transmitted to exterior shell 25. Although this effect does not bring the shell above a safe handling temperature even where there is a substantially continuous line contact between the lid and the shell, as in the construction of Figs. 2 and 7, it is preferably avoided as by the construction described in connection with Fig. 8. Thus, the arrangement of Fig. 8, in which air is permitted to circulate between the heater lid and shell, affords an even lower temperature at the shell and makes handling thereof somewhat more comfortable. In this connection, it may be noted that the temperature within heating chamber 40 is most usually held to (black heat) 900 to 905° F. or less, but the heater construction described herein is capable of operation at temperatures of 1200° F. (red heat) without damaging the heater.

Hence, while we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness between said two shells, said second shell encompassing a heating chamber substantially larger than the base portion of a particular size flask to be heated; an electrical heating element, supported within said heating chamber in spaced heat-insulating relation with respect to said second shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

2. A flask heater comprising a first shell of perforated sheet metal having a relatively highly reflective surface; a second shell of substantially imperforate sheet metal having a relatively highly reflective surface, supported within said first metal shell in spaced relation thereto to afford an air space of substantial thickness separating said two shells, said second shell defining a substantially liquid-tight heating chamber substantially larger than the base portion of a particular size flask to be heated; an electrical heating element of essentially disc-like configuration having a central opening comprising a minor fractional portion of the total surface area thereof; means supporting said heating element within said chamber in spaced heat-insulating relation with respect to said second shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heating element and reflected inwardly by said metal shells through the mesh basket to heat such a flask.

3. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated; a layer of insulating material of substantial thickness covering the bottom internal surface of said second shell; an electrical heating element of essentially annular configuration supported upon said insulating layer and overlying substantially all but a central minor fractional portion of the surface of said insulating layer; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

4. A flask heater comprising a first shell of metal mesh material having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of the largest size flask to be heated; an electrical heating element, supported within said heating chamber in spaced heat-insulating relation with respect to said second shell; and a plurality of metal mesh baskets, each adapted to be removably supported by one of said shells, and each including a part having a configuration corresponding to that of the base portion of a different size flask to be heated, for suspending flasks of different sizes within said heating chamber in spaced relation with respect to said heating element and the sides of said chamber to enable heat radiated from said heating element and reflected inwardly by said metal shells through the mesh basket to heat such a flask.

5. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated; a layer of insulating material of substantial thickness covering the bottom internal surface of said second shell; an electrical heating element, supported upon said insulating layer; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heating element and reflected inwardly by said metal shells through the mesh basket to heat such a flask.

6. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated; a refractory heat-insulating lining of substantial thickness within said heating chamber; an electrical heating element, supported above the base of said insulating lining within said heating chamber in spaced heat-insulating relation with respect to said second shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

7. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated; a refractory heat-insulating lining comprising a plurality of asbestos-filled ceramic slabs closely fitted with each other and within said second metal shell to insulate the interior of said chamber from said second shell; an electrical heating element, supported within said heating chamber above the base of said insulating lining in spaced heat-insulating relation with respect to said second shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

8. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated; an electrical heating element, supported within said heating chamber in spaced heat-insulating relation with respect to said second shell; a metal lid, removably supported by one of said shells, having a central opening generally corresponding in configuration and dimensions to the base portion of a flask of predetermined size; and a metal mesh basket affixed to and depending from said lid in alignment with said central opening and including a part having a configuration corresponding to that of the base portion of a flask of said predetermined size, for suspending a flask within said heating chamber in spaced relation with respect to said heating element and the sides of said chamber to enable heat radiated from said heater element and reflected inwardly by said metal shells through the mesh basket to heat such a flask.

9. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of the largest size flask to be heated; an electrical heating element, supported within said heating chamber in spaced heat-insulating relation with respect to said second shell; a metal lid, having a central opening generally corresponding in configuration and dimensions to the base portion of a flask of predetermined size; means, comprising a plurality of relatively small support members, for removably supporting said lid in spaced, substantially heat-insulating relationship upon the upper edge of said first shell; and a metal mesh basket, affixed to and depending from said lid in alignment with said central opening and including a part having a configuration corresponding to that of the base portion of a particular size flask to be heated, for suspending a flask within said heating chamber in spaced relation with respect to said heating element and the sides of said chamber to enable heat radiated upwardly from said heating element and heat radiated outwardly from said heater element and reflected inwardly by said metal shells to heat such a flask.

10. A flask heater comprising a first shell of metal mesh having a relatively highly reflective surface; a second shell of substantially imperforate metal having a relatively highly reflective surface, supported within said first metal shell in spaced relation thereto to afford an air space of substantial thickness separating said two shells, said second shell defining a heating chamber substantially larger than the base portion of a particular size flask to be heated, a reflector, comprising a relatively highly reflective sheet of metal of a size and configuration substantially corresponding to the bottom of said second shell, supported in mutually spaced heat-insulating relationship between the bottom portions of said metal shells; an electrical heating element, supported within said heating chamber in spaced heat-insulating relation with respect to said second shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

11. A flask heater comprising a frame including a first shell of metal mesh having a relatively highly reflective inner surface; a second shell of substantially imperforate metal having a relatively highly reflective inner surface, supported within said first metal shell and having side walls spaced from opposed side walls of the first shell to afford an interposed air space of substantial thickness therebetween, said second shell encompassing a heating chamber substantially larger than the base portion of a particular size flask to be heated; an electrical heating element, supported within said heating chamber in spaced heat-insulating relation with respect to said second shell; and a metal mesh basket, removably supported upon said frame and including a part having a configuration corresponding to that of the base portion of a particular size flask to be heated, for suspending a flask within said heating chamber in spaced relation with respect to said heating element and the portions of said inner shell defining said chamber to enable heat radiated from said heater element and reflected inwardly by said metal shells through the mesh basket to heat such a flask.

12. A flask heater comprising a frame including a first shell of metal mesh having a relatively highly reflective inner surface; a second shell of substantially imperforate metal having a relatively highly reflective inner surface, supported within said first metal shell and having side walls spaced from opposed side walls of the first shell to afford an interposed air space of substantial thickness therebetween, said second shell encompassing a heating chamber substantially larger than the base portion of a particular size flask to be heated; an electrical heating element, supported within said heating chamber in spaced heat-insulating relation with respect to said second shell; and means removably supported on said frame and including a part having a configuration corresponding to that of the base portion of a particular size flask to be heated, for suspending a flask within said heating chamber in spaced relation with respect to said heating element and the portions of said inner shell defining said chamber to enable heat radiated from said heater element and reflected inwardly by said metal shells through the mesh basket to heat such a flask.

13. A flask heater comprising a first shell of metal mesh having a relatively highly reflective surface; means, including a second metal shell having a relatively highly reflective surface supported within said first metal shell in spaced relation thereto to afford an air space of substantial thickness between said two shells, for defining a substantially liquid-tight heating chamber substantially larger than the base portion of a particular size flask to be heated; an electrical heating element, supported within said heating chamber in spaced heat-insulating relation with respect to said second metal shell; and a metal mesh basket, removably supported by one of said shells, and including a part having a configuration corresponding to that of the base portion of a particular size flask to be heated, for suspending a flask within said heating chamber in spaced relation with respect to said heating element and the sides of said chamber to enable heat radiated from said heater element and reflected inwardly by said metal shells through the mesh basket to heat such a flask.

14. A flask heater comprising a frame including a first shell of metal mesh having a relatively highly reflective inner surface; means, comprising a second metal shell having a highly reflective inner surface supported within said first metal shell and spaced from said first shell to afford an interposed air space of substantial thickness therebetween, for defining a substantially liquid-tight heating chamber substantially larger than the base portion of a particular size flask to be heated; an electrical heating element, supported within said heating chamber in spaced heat-insulating relation with respect to said second shell; and means removably supported on said frame and including a part having a configuration corresponding to that of the base portion of a particular size flask to be heated, for suspending a flask within said heating chamber in spaced relation with respect to said heating element and the portions of said inner shell defining said chamber to enable heat radiated from said heater element and reflected inwardly by said metal shells through the mesh basket to heat such a flask.

15. A flask heater comprising: a frame including a first shell of metal mesh having a relatively highly reflective surface; a metal mesh basket removably supported by the frame and including a part having a configuration corresponding to that of the base portion of a flask of predetermined size; a second metal shell included in said frame and having a relatively highly reflective surface; said second metal shell being disposed within the first metal shell in spaced relation thereto to afford an air space of substantial thickness between the two shells, at least the lower portion of said second metal shell also being spaced from the metal basket; and an electrical heating element disposed within the second metal shell in spaced relation with respect to said metal basket, said heating element, said basket, and said second shell affording a heating chamber wherein heat radiated from the heating element and reflected inwardly by said metal shells through the mesh basket is effective to heat a flask supported in said basket.

16. A flask heater comprising: a frame including a first shell of metal mesh having a relatively highly reflective surface; a metal mesh basket removably supported by the frame and including a part having a configuration corresponding to that of the base portion of a flask of predetermined size; a second metal shell included in said frame and having a relatively highly reflective surface; said second metal shell being disposed within the first metal shell in spaced relation thereto to afford an air space of substantial thickness between the two shells, at least the lower portion of said second metal shell also being spaced from the metal basket; and an electrical heating element disposed within the second metal shell in spaced relation with respect to said metal basket, said heating element, said basket, and said second shell affording a heating chamber wherein heat radiated from the heating element and reflected inwardly by said metal shells through the mesh basket is effective to heat a flask supported in said basket, said heating element having an opening formed therein in the portion thereof most nearly adjacent to said metal basket to insure substantially uniform radiant heating of the flask disposed in the basket.

References Cited in the file of this patent
UNITED STATES PATENTS

| | | |
|---|---|---|
| 2,282,078 | Morey | May 5, 1942 |
| 2,450,981 | Newman | Oct. 12, 1948 |
| 2,498,442 | Morey | Feb. 21, 1950 |
| 2,631,216 | Ames | Mar. 10, 1953 |
| 2,664,495 | Wehrli | Dec. 29, 1953 |